United States Patent
Brans et al.

(10) Patent No.: US 7,634,561 B2
(45) Date of Patent: Dec. 15, 2009

(54) APPLICATION USAGE METERING MANAGEMENT SYSTEM

(75) Inventors: Bonita S. Brans, Erie, CO (US); Kenneth D. Christiance, Cary, NC (US); Michael B. Oliver, Chapin, SC (US); Ravirajan Rajan, Apex, NC (US); Richard J. Sheftic, Essex Junction, VT (US); Michael J. Spisak, East Northport, NY (US)

(73) Assignee: International Business Machines Corporation, Armonk, NY (US)

(*) Notice: Subject to any disclaimer, the term of this patent is extended or adjusted under 35 U.S.C. 154(b) by 380 days.

(21) Appl. No.: 11/552,996

(22) Filed: Oct. 26, 2006

(65) Prior Publication Data

US 2008/0104222 A1 May 1, 2008

(51) Int. Cl.
  *G06F 15/173* (2006.01)
(52) U.S. Cl. .................. 709/224; 709/223; 709/225; 709/226; 709/229; 705/52
(58) Field of Classification Search .............. 709/201, 709/223, 224, 225, 226, 229; 705/52
  See application file for complete search history.

(56) References Cited

U.S. PATENT DOCUMENTS

| | | | | |
|---|---|---|---|---|
| 5,655,081 | A * | 8/1997 | Bonnell et al. | 709/202 |
| 6,088,659 | A * | 7/2000 | Kelley et al. | 702/62 |
| 6,900,738 | B2 | 5/2005 | Crichlow | |
| 2001/0054026 | A1 | 12/2001 | Choate | |
| 2003/0009507 | A1 | 1/2003 | Shum | |
| 2003/0135474 | A1 | 7/2003 | Circenis et al. | |
| 2004/0117224 | A1 | 6/2004 | Agarwal et al. | |
| 2004/0216113 | A1 | 10/2004 | Armstrong et al. | |
| 2004/0243524 | A1 | 12/2004 | Crichlow | |
| 2004/0267548 | A1 | 12/2004 | Jones | |

(Continued)

OTHER PUBLICATIONS

Paolo Bellavista et al., "Mobile Agent Solutions for Accounting Management in Mobile Computing," Computers and Communications, 2002 Proceedings; ISCC 2002 Seventh International Symposium on Jul. 1-4, 2002, Piscataway, NJ, USA, IEEE, pp. 753-760.

(Continued)

*Primary Examiner*—William C Vaughn, Jr.
*Assistant Examiner*—Farrukh Hussain
(74) *Attorney, Agent, or Firm*—William H. Steinberg; Schubert Osterrieder & Nickelson PLLC (57) ABSTRACT

Generally speaking, systems, methods and media for managing an application usage metering system are disclosed. Embodiments of the method may include initiating discovery agents for one or more server resources and interrogating by the discovery agents the one or more server resources to discover a plurality of discrete server processes and associated discovery data for each process. Embodiments may also include collecting discovery data for the discovered discrete server processes in a centralized repository and mapping one or more of the processes to an application and a customer based on the collected discovery data. Further embodiments may also include performing an administrative function based on the mapped discrete server processes, such as generating a customer bill, generating a report based on the mapped discrete server processes, assigning a customer to a process, or changing a status of a discrete server process.

17 Claims, 5 Drawing Sheets

U.S. PATENT DOCUMENTS

2005/0010502 A1     1/2005    Birkestrand et al.
2005/0010667 A1     1/2005    Moriki et al.
2005/0086062 A1*   4/2005    Clark et al. .................... 705/1
2005/0125314 A1*   6/2005    Agarwal et al. ............... 705/30
2008/0048883 A1*   2/2008    Boaz .................... 340/870.02

OTHER PUBLICATIONS

Alfonso Fuggetta et al., "Understanding Code Mobility," IEEE Transactions on Software Engineering, IEEE Service Center, Los Alamitos, CA, US., vol. 24, No. 5, May 1, 1998, pp. 342-361.

ISR including PCT transmittal, From the International Searching Authority, mailed Apr. 17, 2008, Applicant: International Business Machines Corporation, International Application No. PCT/EP2007/061106, pp. - 5.

PCT Written Opinion of International Searching Authority, mailed Apr. 17, 2008, Applicant: International Business Machines Corporation, International Application No. PCT/EP2007/061106, pp - 6.

* cited by examiner

APPLICATION USAGE METERING MANAGEMENT SYSTEM

FIELD OF INVENTION

The present invention is in the field of data processing systems and, in particular, to systems, methods and media for managing an application usage metering system.

BACKGROUND

Computer systems are well known in the art and have attained widespread use for providing computer power to many segments of today's modern society. Computer systems such as personal computers (PCs) and servers may typically include a system unit having a central processing unit (CPU) and associated volatile and non-volatile memory, including random access memory (RAM) and basic input/output system read only memory (BIOS ROM), a system monitor, a CD-ROM or DVD-ROM drive, a fixed disk storage drive (also known as a "hard drive"), user input devices, and a network interface adapter. One of the distinguishing characteristics of these systems is the use of a motherboard or system planar to electrically connect these components together. Computers systems typically include software such as computer programs in addition to the hardware. As advances in semiconductor processing and computer architecture continue to push the performance of computer hardware higher, more sophisticated computer software has evolved to take advantage of the higher performance of the hardware, resulting in computer systems that continue to increase in complexity and power.

Computer systems have thus evolved into extremely sophisticated devices that may be found in many different settings. One problem with computer systems today is balancing the cost of the computer hardware with fluctuating demands on computer resources. In most networked computing systems, there are times when demands on computer resources are relatively high and other times when demands are relatively low. A computer system utilized by an e-commerce retailer may, for example, have greater need of computing resources during busing shopping seasons such as during the time leading up to Christmas or Mother's Day. Another problem facing computer administrators today is providing satisfactory access to an application to multiples users in an organization. In many cases, for example, an administrator must facilitate installation of an application on the computer system of each user as well as maintaining and updating the applications, which can be a labor-intensive process, particularly for large organizations with many users.

One solution to these problems is provide for on demand applications that a user may access via a network only when needed, ensuring usage of the latest version of the application and providing the opportunity to charge users only for their specific usage. This model has proven popular as customers are charged only for their usage and need not overpay during times of minimal need. Accurate billing for usage is desired by both the application provider and its customers so that the customer is charged for their precise usage. Billing for on demand application usage is often based on a transaction billing system that charges for each usage of an application, the time of usage, or other metric, but such a billing system does not provide a pure representation of application usage of information technology (IT) resources such as the CPU or memory and is thus less desirable. Billing for on demand application may also be accomplished by measurement of usage of different, specific computer resources (such as processor cycles, memory usage, etc.) to provide a more accurate billing. Resource usage billing methodologies, however, often fail when applications are hosted on distributed platforms or in a shared or multi-application environment. Hosting of applications on multiple computer platforms or resources makes it difficult to track application usage, resulting in inefficient manual corrections by administrators. Similarly, a resource may be utilized by multiple users and/or applications simultaneously, providing additional difficulties in efficiently and effectively tracking application usage.

SUMMARY OF THE INVENTION

The problems identified above are in large part addressed by systems, methods and media for managing an application usage metering system. Embodiments may include a method for managing application usage. Embodiments of the method may include initiating discovery agents for one or more server resources and interrogating by the discovery agents the one or more server resources to discover a plurality of discrete server processes and associated discovery data for each process. Embodiments of the method may also include collecting the discovery data for the discovered discrete server processes in a centralized repository and mapping one or more of the discovered discrete server processes to an application and a customer based on the collected discovery data. Further embodiments may include scanning the network for server resources based on defined conditions and discovering one or more server resources during a scan of a network. Further embodiments of the method may also include performing an administrative function based on the mapped discrete server processes, where administrative functions may include generating a customer bill, generating a report based on the mapped discrete server processes, assigning a customer to a discovered discrete server process, or changing a status of a discrete server process.

Another embodiment provides an article comprising a computer-readable medium containing instructions effective, when executing in a data processing system, to cause the system to perform a series of operations for managing an application usage metering system. The series of operations generally includes a series of operations for initiating discovery agents for one or more server resources and interrogating by the discovery agents the one or more server resources to discover a plurality of discrete server processes and associated discovery data for each process. Embodiments may also include a series of operations for collecting the discovery data for the discovered discrete server processes in a centralized repository and a series of operations for mapping one or more of the discovered discrete server processes to an application and a customer based on the collected process information based on the collected discovery data.

A further embodiment provides an on demand application system including one or more on demand platforms and a usage metering and billing (UMB) server in communication with the on demand platforms via a network. The on demand platforms may execute discrete server processes of an on demand application and may each include a discovery agent to interrogate the on demand platform to discover the discrete server processes and associated discovery data for each process. The UMB server may include a UMB management module to receive discovery data relating to discovered discrete server processes from the discovery agents and a centralized repository to store discovery data relating to discovered discrete server processes. The UMB server may also include an assignment processor of the UMB management module to map the stored discrete server processes to an application and a customer based on the collected discovery data.

BRIEF DESCRIPTION OF THE DRAWINGS

Aspects of certain embodiments of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for managing an application usage metering system are disclosed. Embodiments may include a method for managing application usage. Embodiments of the method may include initiating discovery agents for one or more server resources and interrogating by the discovery agents the one or more server resources to discover a plurality of discrete server processes and associated discovery data for each process. Embodiments of the method may also include collecting the discovery data for the discovered discrete server processes in a centralized repository and mapping one or more of the discovered discrete server processes to an application and a customer based on the collected discovery data. Further embodiments may include scanning the network for server resources based on defined conditions and discovering one or more server resources during a scan of a network. Further embodiments of the method may also include performing an administrative function based on the mapped discrete server processes, where administrative functions may include generating a customer bill, generating a report based on the mapped discrete server processes, assigning a customer to a discovered discrete server process, or changing a status of a discrete server process.

The system and methodology of the disclosed embodiments allows for management of an application usage metering system. The disclosed system provides a mechanism for process discovery, assignment, and reconciliation for on demand applications, including those hosted on distributed platforms. The disclosed system may thus provide for effective and efficient management of an application usage metering system, particularly in a shared or multi-application environment. By using the disclosed methodology, the provider of an on demand application may more precisely bill for usage of computer resources for each user of an on demand application that is hosted on a distributed platform.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Figure 1:
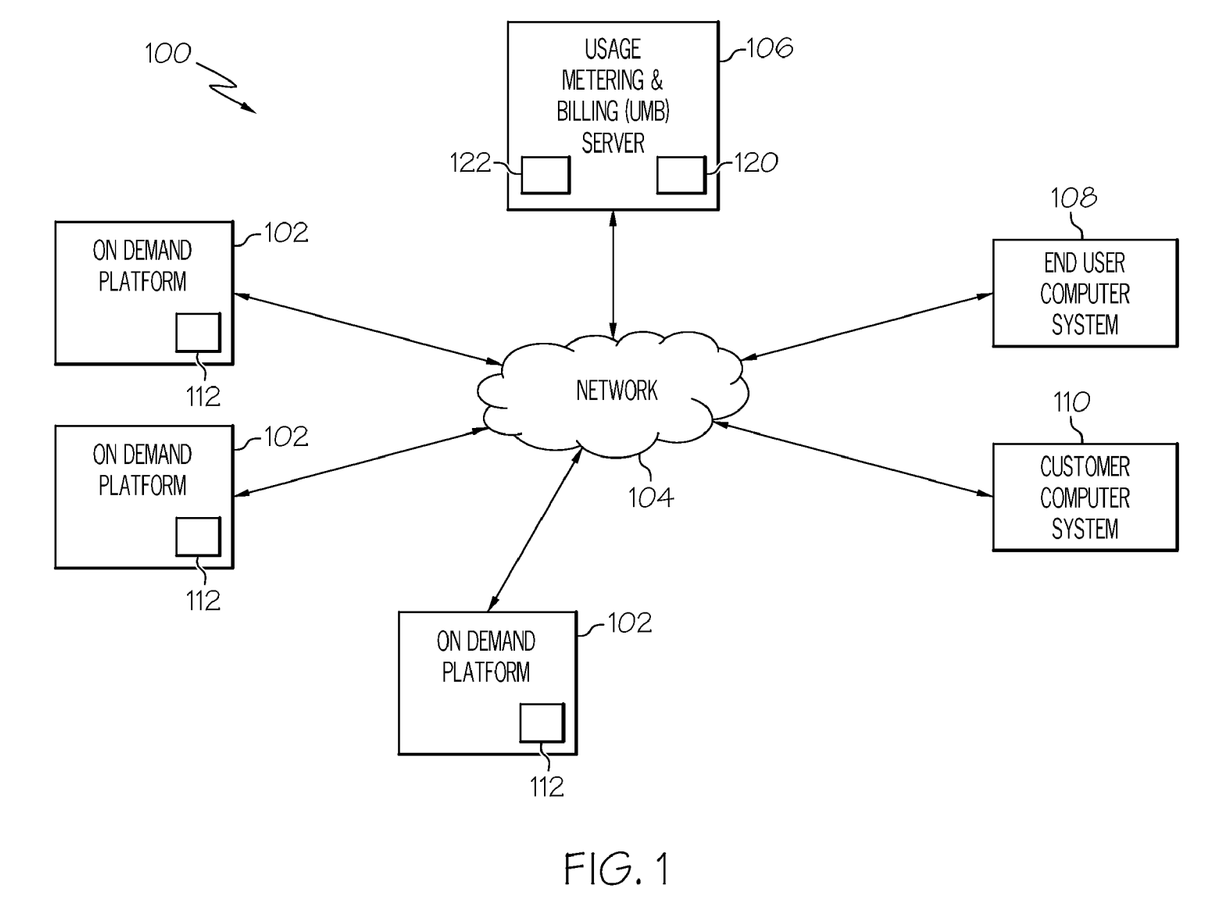
FIG. 1 depicts an environment for an on demand application system with a usage metering and billing server and a plurality of on demand platforms with discovery agents according to some embodiments.

Turning now to the drawings, FIG. 1 depicts an environment for an on demand application system with a usage metering and billing server and a plurality of on demand platforms with discovery agents according to some embodiments. In the depicted embodiment, the on demand application system 100 includes a usage metering and billing (UMB) server 106 in communication with a plurality of on demand platforms 102 via a network 104. One or more on demand applications may each be executing on the one or more on demand platforms 102 and the UMB server 106 may receive and process information relating to the application execution to meter and bill customer usage. In some embodiments, a user of an end user computer system 108 may access applications executing on the on demand platforms 102 via a network connection such as network 104. Similarly, in some embodiments, a customer may utilize a customer computer system 110 to interact with the UMB server 106 via network 104 to review billing or other information, such as if the customer desires to see the charged incurred by users that are part of its organization. As will be described in more detail subsequently, the disclosed on demand application system 100 may provide for process discovery, assignment, and reconciliation for metering usage of on demand applications.

The on demand platforms 102 may each include one or more personal computers, workstations, servers, mainframe computers, notebook or laptop computers, desktop computers, or other computers systems adapted to execute computer programs. In some embodiments, an on demand platform 102 may be implemented on a server computer, such as an International Business Machine Corporation (IBM) eServer® server, an IBM Websphere® application server, or a computer system as described in relation to FIG. 2. The on demand platforms 102 may include a variety of types of servers, such as database servers, Web servers, application servers, and other types of servers. Each on demand platform 102 may execute all or part of one or more applications, including on demand applications. A particular on demand application may thus be executing on multiple on demand platforms 102 simultaneously in some embodiments. On demand applications may be any applications for which a customer or other user may subscribe or access. Execution of the on demand application on an on demand platform 102 may be accomplished by the execution of one or more discrete server processes on one or more on demand platforms 102. An on demand platform 102 may include one or more server resources, which may be any servers or virtualized servers that are adapted to execute an application. An on demand platform 102, for example, may have multiple virtual partitions each representing a server resource while another on demand platform may be considered a single server resource.

A particular on demand application that is executing may therefore, in some embodiments, include a plurality of discrete server processes executing on a variety of server resources of different on demand platforms 102. In this example, the on demand application may be simultaneously serving multiple users, resulting in processes associated with the different users executing on the different server resources.

The on demand platforms 102 may have a discovery agent 112 executing on it to interrogate its server resources to detect discrete server processes of various applications executing on the server resource. In some embodiments, the UMB server 106 may initiate the discovery agents 112 on the on demand platforms 102. One discovery agent 112 may serve each server resource or a single discovery agent 112 may server multiple server resources, such as if the discovery agent 112 serves all server resources of an on demand platform 102. The discovery agent 112 may be a "lightweight" agent that can interrogate a server resource to detect executing server processes. The discovery agent 112 may then communicate some or all of the detected information to the USB server 106 for incorporation into a centralized repository. The discovery agent 112 may, for example, list executing processes with hierarchy ownership identified to provide discovery data associated with a particular process. The discovery data may therefore include the identification of server processes and its hierarchy. The "path" of a server process may represent its location within a hierarchy. To interrogate the server resource, the discovery agent 112 may scan outside ports, services, network traffic, or other indications of executing processes or use of computer resources, allowing the discovery agent 112 to detect the use of different computational resources.

Network 104 may be any type of data communications channel or combination of channels, such as the Internet, an intranet, a LAN, a WAN, an Ethernet network, a wireless network, telephone network, a proprietary network, or a broadband cable network. Network 104 may serve as a communication medium between components of the on demand application system 100. In one example, the Internet or other public network may be particularly useful as network 104 between end user computer systems 108 that are widely distributed from the on demand platforms 102, while a LAN may be particularly useful to facilitate communication between on demand platforms 102 and a USB server 106 located within the same organization. Those skilled in the art will recognize, however, that the invention described herein may be implemented utilizing any type or combination of data communications channel(s) without departure from the scope and spirit of the invention.

Figure 2:
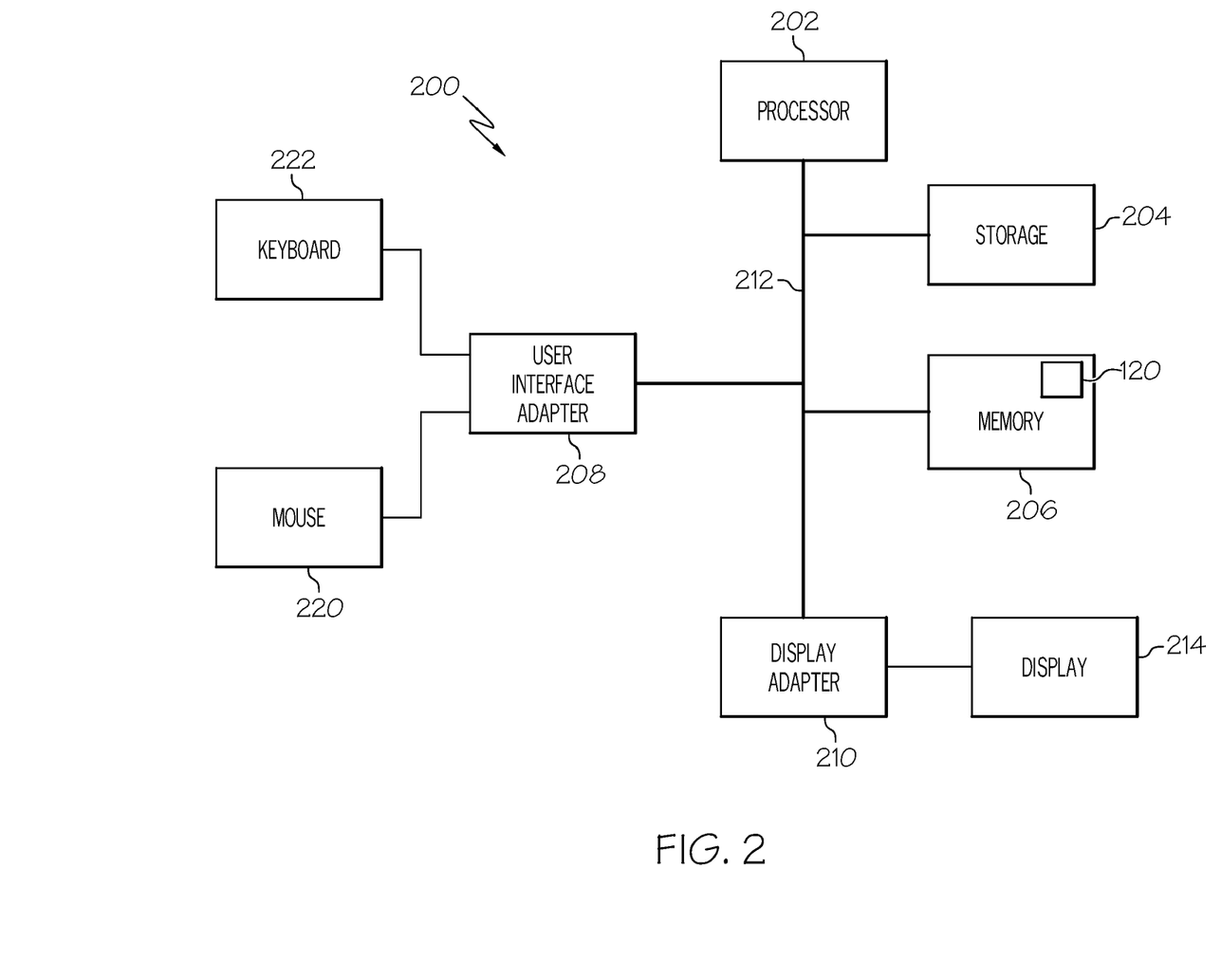
FIG. 2 depicts a block diagram of one embodiment of a computer system suitable for use as a component of the on demand application system, such as one of the on demand platforms, the UMB server, a end user computer system, or a customer computer system.

Similarly to the on demand platforms 102, the USB server 106 may be implemented on a server computer, such as an International Business Machine Corporation (IBM) eServer® server, an IBM Websphere® application server, or a computer system as described in relation to FIG. 2. The UMB server 106 may include a UMB management module 120 and a centralized repository 122, both of which are described in more detail subsequently in relation to FIG. 3. The UMB management module 120 may perform a variety of tasks, including scanning a network to detect server resources and initiating a discovery agent 112 to service each discovered server resource 112 (or its on demand platform 102). The UMB management module 120 may also receive discovery data relating to discovered discrete server processes from the discovery agents 112 and may collect and store the discovery data in centralized repository 122. The UMB management module 120 may also map discovered discrete server processes to an application and a customer based on the collected discovery data, as will be described in more detail in relation to FIG. 4. After mapping the processes to particular applications and customers, the UMB management module 120 may facilitate performing various administrative functions, such as generating a customer bill or a report.

The end user computer systems 108 may be any type of computer systems with users accessing on demand applications executing on the on demand platform(s) 102. In one example, a Web-based on demand application may be accessed by users using a browser executing on an end user computer system 108. A browser may be a graphical browser application that allows a user to view Internet or intranet content such as Microsoft Corporation's Internet Explorer™, Netscape Communication Corporation's Navigator™, Mozilla Foundation's Firefox, Opera Software ASA's Opera, Apple Corporation's Safari™, etc. Browsers, at their most basic level of operation, permit users to connect to a given network site, download informational content from that site, and display that information to the user. IT personnel of a customer of on demand applications, for example, may utilize a customer computer system 110 to access the USB server 106 to access information about their account, such as billing information or records.

In the on demand application system 100, the components may be located at the same location, such as in the same building or computer lab, or could be remote. While the term "remote" is used with reference to the distance between the components of the on demand application system 100, the term is used in the sense of indicating separation of some sort, rather than in the sense of indicating a large physical distance between the systems. For example, any of the components of the on demand application system 100 may be physically adjacent or located as part of the same computer system in some network arrangements.

The systems and methodologies of the disclosed embodiments provide an efficient and effective mechanism for managing an application usage metering system such as the on demand application system 100. Usage of resources of the on demand platforms 102 may be metered and tracked by the discovery agents 112 in conjunction with the UMB server 106, providing for more accurate measurement of application usage even when a particular application is being executed on multiple server resources and is being used by multiple users associated with different customers. The ability to track resource usage of on demand applications facilitates management of the on demand application system 100, such as by providing for report generation, automatic customer billing, or other functions.

FIG. 2 depicts a block diagram of one embodiment of a computer system 200 suitable for use as a component of the on demand application system 100, such as one of the on demand platforms 102, the UMB server 106, an end user computer system 108, or a customer computer system 110. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the UMB server 106, such as mapping discovered discrete server processes to an application and customer, and may temporarily or permanently store information during its calculations or results after calculations in storage 204 or memory 206. All of part of the UMB management module 120, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. An administrator using a UMB server 106, for example, may utilize the keyboard 222 and mouse 220 to interact with the UMB management module 120 to correct errors, request reports or generated bills, or the performance of other tasks. The bus 212 may also connect the processor 202 to a display, such as an LCD display or CRT monitor, via the display adapter 210.

Figure 3:
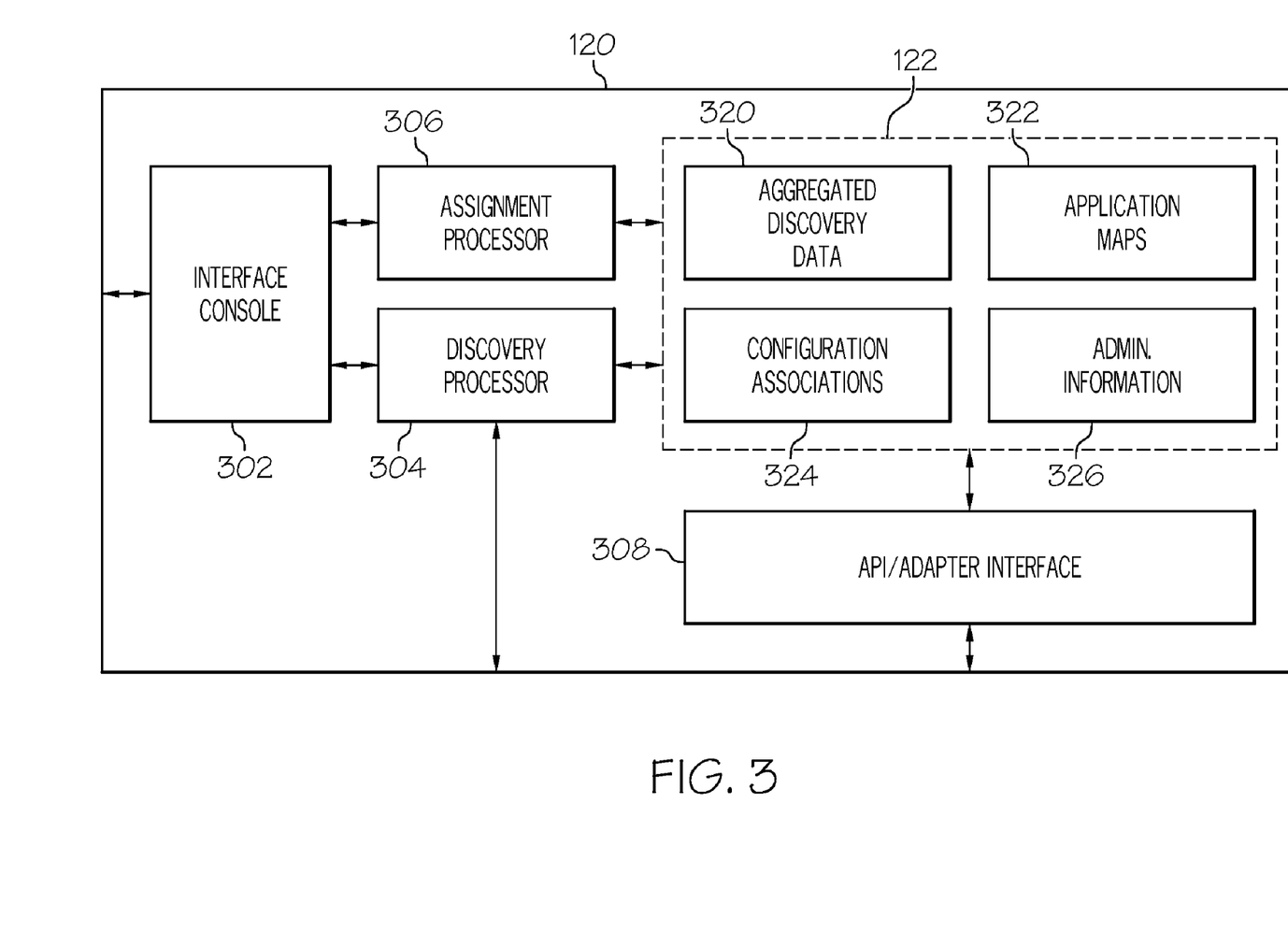
FIG. 3 depicts a conceptual illustration of software components of an UMB management module and the centralized repository of the on demand application system according to some embodiments.

FIG. 3 depicts a conceptual illustration of software components of an UMB management module 120 and the centralized repository 122 of the on demand application system according to some embodiments. As described previously (and in more detail in relation to FIGS. 4 and 5), the UMB management module 120 may initiate discovery agents 112, receive discovery data relating to discovered discrete server processes from the discovery agents 122, collect and store the discovery data in the centralized repository 122, and map the stored discrete server processes to an application and customer based on the collected discovery data. In some embodiments, the centralized repository 122 may be wholly or partially contained within the UMB management module 120, while in other embodiments the centralized repository 122 may be separate from (but in communication with) the UMB management module 120.

The UMB management module 120 may include an interface console 302, a discovery processor 304, an assignment processor 306, and API/adapter interface 308, and optionally the centralized repository 122. The interface console 302 may serve as an interface between the UMB management module 120 and a user. Users may include, for example, an administrator or customer account manager of a provider of on demand applications. In some embodiments, the interface console 302 may include a graphical user interface (GUI) to facilitate communication with users. The interface console 302 may receive input from a user, such as requests to begin initiating discovery agents or interrogating server resources, requests to scan for server resources, requests to generate a customer bill or a report, requests to modify or correct information stored in the central repository 122, or other information.

The interface console 302 may also provide output to a user via display, e-mail, printout, or other means, and the output may include customer bills, reports, results of scans or interrogations, results of mapping, or other information. In some embodiments, the interface console 302 may graphically display discovered application maps to associated customers as well as graphically displaying processes and applications. In these embodiments, users may be able to receive multiple views, including the ability to move down a hierarchy to explore maps, resources, applications and processes. In many embodiments, the interface console 302 may allow for refreshing defined application maps and structures to facilitate dynamic change management functionality.

The discovery processor 304 may receive facilitate communication and interaction with the on demand platforms 102 and any discovery agents 112 via network 104. The discovery processor 304 may scan a network for server resources and discover one or more resources during the scan. In one example, the discovery processor 304 may scan a network of on demand platforms 102 to discover their server resources. In some embodiments, the discovery processor 304 may perform its scan based on defined conditions, such as by limiting its scan to an IP range, particular on demand platforms 102, certain protocols, the type of network traffic going to-and-from a server resource, etc. The discovery processor 304 may also receive discovery data relating to discovered discrete server processes from discovery agents 112 and may collect and store the discovery data in the centralized repository 122.

The assignment processor 306, as will be described in more detail in relation to FIG. 5, may access stored discovery data in the centralized repository 122 and map the discovered discrete server processes to an application and a customer based on the collected discovery data. A usage and metering engine of the assignment processor 306 may then aggregate costs for a particular customer and generate an accurate measurement of the true usage of IT resources. To accomplish the mapping (and as described in more detail subsequently), the assignment processor 306 may, for example, compare a discovered path to an application map associated with a customer to determine whether the process is associated with the customer and application. The assignment processor 306 may then also store the results of the mapping in the centralized repository 122. After the assignment processor 306 has finished mapping, the different discovered processes may have associated applications and customers, allowing for insight into the magnitude of server resources being utilized by a particular customer and a particular application. The assignment processor 306 may also perform various administrative tasks based on these results, such as generating reports or customer bills.

The optional API/adapter interface 308 may provide an interface for other applications to access information contained within the centralized repository 122. IT applications, change management applications, or other types of applications may desire to access stored information in the centralized repository 122 in certain embodiments and the API/adapter interface 308 may facilitate such interaction.

The centralized repository 122 may include a variety of types of information, including aggregated discovery data 320, application maps 322, configuration associations 324, and administrative information 326. The aggregated discovery data 320 may include discovery data gathered by discovery agents 112 and collected and stored by the discovery processor 304, as described previously. In some embodiments, the aggregated discovery data 320 may include a list of executing processes with hierarchy ownership for each. The application maps 322 may include a plurality of business application maps associated with a particular customer. The business application maps for a customer may define well-known services (e.g., web, database, protocols, traffic, etc.) and well-known processes (e.g., resource daemons, etc.) associated with the customer. The assignment processor 306 may interrogate the aggregated discovery data 320 and associate it with customers by matching the discovery data with the application maps 322. The configuration associations 324 may include information relating to detected server resources, including the configuration of different on demand platforms 102 and their server resources. Configuration association 324 information may be stored by the discovery processor 304 after network scanning and server resource detection. Administrative information 325 may include administrative reports, logging, audit information, or other types of information. In one example, administrative information 326 may include information for a task management system including process assignments, roles, and actions taken.

Figure 4:
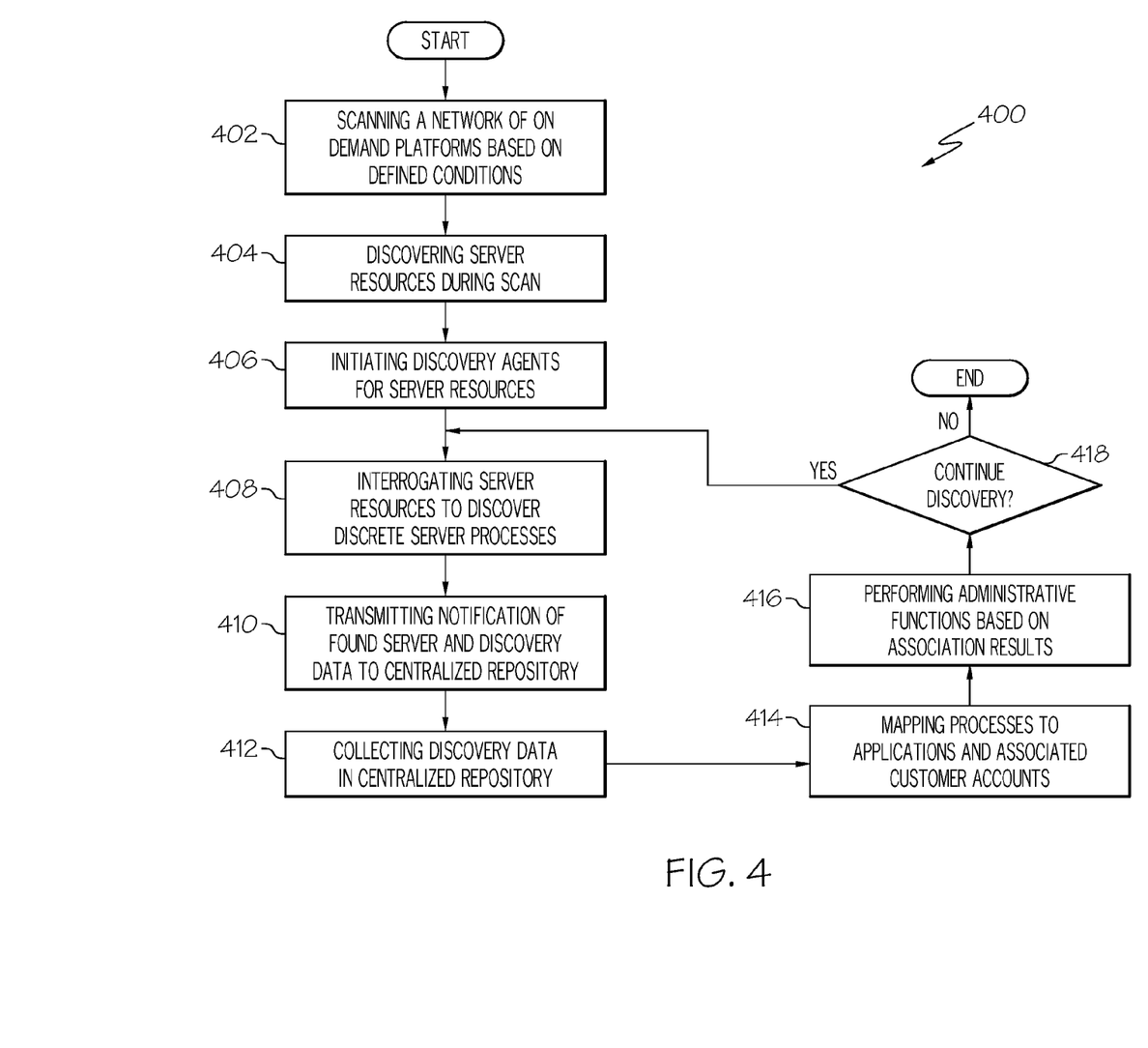
FIG. 4 depicts an example of a flow chart for managing an application usage metering system and associating processes with customers according to some embodiments.

FIG. 4 depicts an example of a flow chart 400 for managing an application usage metering system and associating processes with customers according to some embodiments. The method of flow chart 400 may be performed, in one embodiment, by components of an on demand application system 100, such as a UMB management module 120 and its components as well as discovery agents 112. Flow chart 400 begins with element 402, scanning a network of on demand platforms 102 based on defined conditions and discovering one or more server resources during the scan at element 404. At element 402, the discovery processor 304 may scan a defined network searching for server resources on an on demand platform 102 and may optionally limit its search based on a condition such as an IP range, protocols, the type of network traffic going to-and-from a server resource, user-specified conditions, or other conditions. Conditional discovery of server resources may also be used to "crawl" through a distributed application to find the consumed properties if a user identifies a path for discovery. A path may be a plan for discovering server resources. An example path may define a starting logical partition (i.e., an LPAR or VPAR) and may then specify obtaining and mapping all HTPP traffic with particular headers, interrogating the logical partition process trees, and then finding all servers to which the defined partition sends a particular type of traffic.

After discovering server resources, the discovery processor 304 may at element 406 initiate discovery agents 112 on the on demand platforms 102 and their server resources so that the discovery agents 112 are positioned to interrogate the server resources. In some embodiments, the discovery agents 112 may be located in each discovered server resource so that they may have access to particular processes of the server resources, while in other embodiments, a single discovery agent 112 may be positioned to interrogate multiple server resources. In an alternative embodiment, the discovery agent 112 may be located on the UMB server 106 for interrogation of server resources.

Once discovery agents 112 are initiated, the discovery agents 112 may interrogate the discovered server resources to discover discrete server processes at element 408. To interrogate the server resources, the discovery agent 112 may scan outside ports, services, traffic, or other aspects of the server resources to detect discrete server processes. The discovery agents may also determine discovery information about each discovered server process, such as its name and hierarchy information. Once server processes have been discovered, the discovery agent 112 at element 410 may transmit notification of the found discovery data for the discovered server processes to the UMB server 106 for collection and storage in the centralized repository 122. In some embodiments, the discovery agent 112 may encrypt the transmission for security purposes. The discovery processor 304 may also store and indication of the found server resources in the centralized repository 122.

The discovery processor 304 may at element 412 receive discovery data from the discovery agents 112 and collect the discovery data by storing it in the centralized repository 122 as aggregated discovery data 320. At element 414, the assignment processor 306 may map the stored discrete server processes to applications and associated accounts to associate the processes with customers. As will be described in more detail in relation to FIG. 5, the assignment processor 306 may accomplish this by interrogating the aggregated discovery data 320 and mapping the data to processes and applications based on pre-defined rules and policies. For example, a business application map associated with a particular customer may define well-known services (Web, database, protocols, traffic, etc.) and well-known processes (such as resource daemons) in addition to paths (as described in relation to element 402). By mapping found discovery data using a business application map for a customer, the assignment processor 306 may determine which discrete server processes are associated with a particular customer and application.

Once discrete server processes are associated with a customer and/or application, the assignment processor 306 (possibly in conjunction with the interface console 302) may at element 416 perform administrative functions based on the association results. Administrative functions may include any functions that an administrator or someone managing an on demand application may desire to perform. One common administrative function may be to generate a customer bill based on the resources the customer and its users actually utilized. Another administrative function may be generating a report based on the mapped processes, where such report may include information about unassigned processes, or paths. Other functions may also include assigning a customer to a discovered discrete server process or changing a status of a discrete server process.

After performing any administrative functions, the method of flow chart 400 may continue to decision block 418, where it is determined whether discovery of processes is to be continued. If so, the method returns to element 408 to continue interrogation of server resources to discover discrete server processes. If not, the method terminates.

Figure 5:
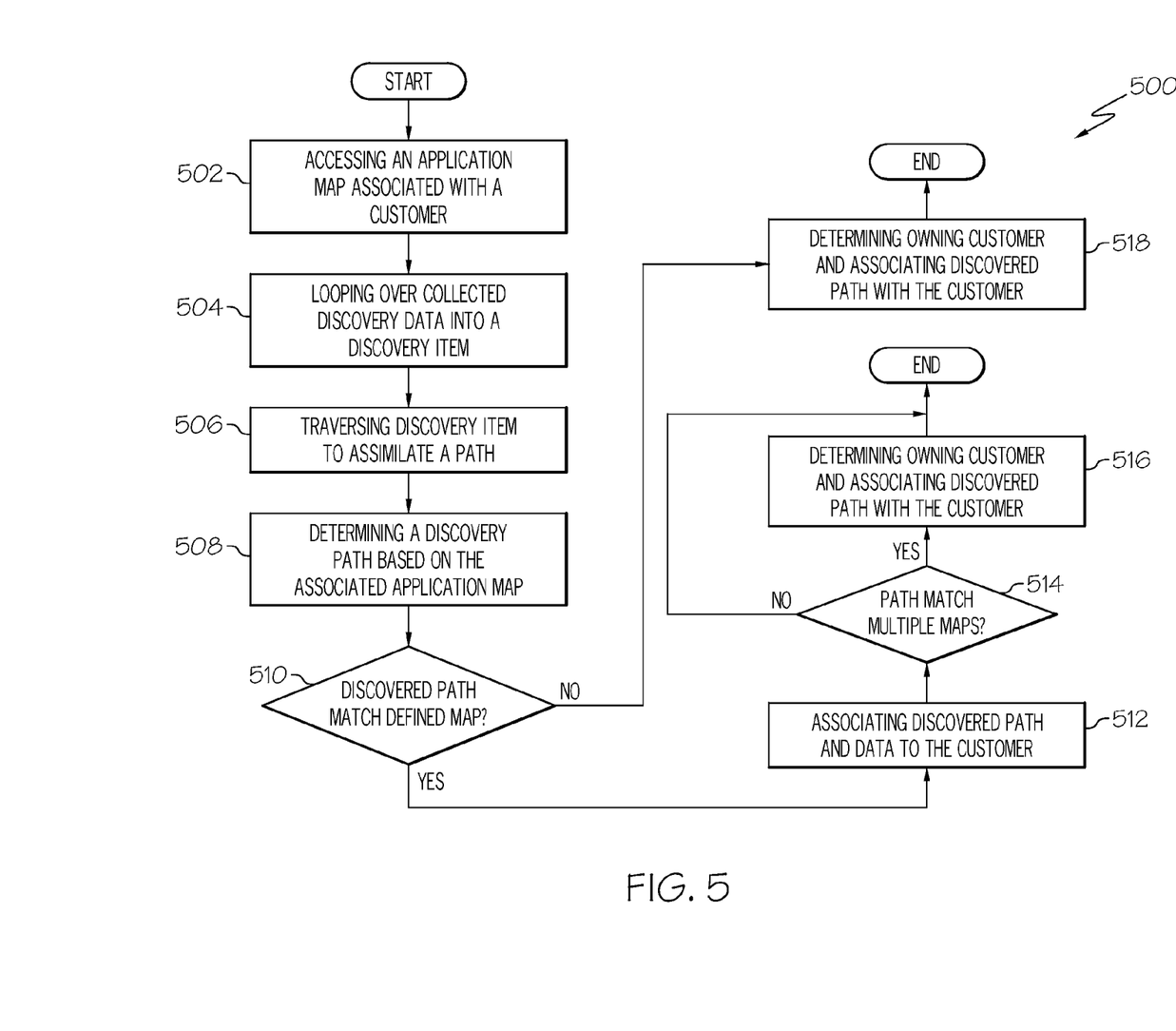
FIG. 5 depicts an example of a flow chart for mapping discovered discrete server processes to applications and associated customer accounts according to some embodiments.

FIG. 5 depicts an example of a flow chart 500 for mapping discovered discrete server processes to applications and associated customer accounts according to some embodiments. The method of flow chart 500 may be performed, in one embodiment, by components of a UMB management module 120 such as the assignment processor 306. Flow chart 500 begins with element 502, where the assignment processor 306 may access an application map associated with a particular customer by accessing stored application maps 322 of the centralized repository 122. The application map associated with a particular customer may define well-known services and processes, as described previously.

The assignment processor 306 may begin mapping by looping over the collected discovery data (into a discovery item) at element 504. The assignment processor 306 may then, at element 506, traverse links within the discovery item to assimilate a path. At element 508, the assignment processor 306 may then look up a discovery path based on the defined application map and compare the discovered path to the defined map. If, at decision block 510, the discovered path matches the defined application map, the assignment processor 306 may associate the path and the discovery data (including its discrete server processes) to the customer associated with the application map at element 512. By mapping found discovery data using a application map for a customer, the assignment processor 306 may determine which discrete server processes are associated with a particular customer and application. The process of element 512 may involve comparing the discovered path to multiple application maps in some embodiments.

If, at decision block 510, the assignment processor 306 determines that the discovered path does not match any defined application maps, the method may continue to element 518, where the assignment processor 306 may determine the owning customer of the discovered path and associate the discovered path with that customer, after which the method terminates. In some embodiments, the assignment processor 306 may determine the owning customer by prompting an administrator other user via a GUI to select the appropriate owning customer that belongs to the discovered path. In other embodiments, the assignment processor 306 may trigger a configurable event or alarm that notifies an administrator or other user that a discovered path is unmatched. In these embodiments, the user may then identify a new owning customer and associate them with the path and discovery data. In this way, a new application map may be dynamically defined for a new customer, allowing the disclosed system to effectively "learn" about new customers. In some cases, a user may decide that a discovered path may simply be ignored and no action should be taken.

If, at decision block 514, the assignment processor 306 determines that the discovered path matches multiple application maps, it may determine the owning customer and associated the discovered path and its discovery data with that customer at element 516, after which the method terminates. In some embodiments, the assignment processor 306 may determine the owning customer by prompting an administrator other user via a GUI to select the appropriate owning customer that belongs to the discovered path from a list of matching customers.

The methodology of flow chart 500 allows for the disclosed system to synchronize itself with changes in defined application maps. This synchronization may also provide the ability to link to associated changes and change control procedures in external systems. The disclosed system may thus initiate a discovery refresh based on planned changes to the application maps and process discrepancies between a planned change and a discovered result.

It will be apparent to those skilled in the art having the benefit of this disclosure that the present invention contemplates methods, systems, and media for managing an application usage metering system. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-implemented method for managing application usage, the method comprising:

initiating, by a usage metering and billing (UMB) management module executing on a server via a network, discovery agents executing on one or more on demand platforms for interrogating one or more server resources each executing on one of the one or more on demand platforms;

interrogating by the discovery agents the one or more server resources to discover a plurality of discrete server processes and associated discovery data for each process, the discovery data comprising a name and hierarchy information associated with each discrete server process;

collecting the discovery data for the discovered discrete server processes in a centralized repository;

accessing an application map associated with a particular customer, wherein the application map defines both services and processes associated with the particular customer;

mapping one or more of the discovered discrete server processes to an application and the particular customer based on the collected discovery data by comparing a discovered path to the application map for the particular customer; and in the event of a match between the discovered path and the application map, associating the discovered path and its discovery data with the particular customer and storing an indication of the association; and generating a customer bill based on discrete server processes mapped to the particular customer.

2. The method of claim 1, further comprising discovering one or more server resources during a scan of a network.

3. The method of claim 2, further comprising scanning the network for server resources based on defined conditions.

4. The method of claim 1, further comprising performing an administrative function based on the mapped discrete server processes.

5. The method of claim 4, wherein performing an administrative function comprises generating a report based on the mapped discrete server processes, assigning a customer to a discovered discrete server process, or changing a status of a discrete server process.

6. The method of claim 1, wherein collecting discovery data for the discovered discrete server processes in the centralized repository comprises receiving notification of a found server resource and associated discovery data.

7. An article comprising a computer-readable medium of a storage device containing instructions effective, when executing in a data processing system, to cause said data processing system to perform operations comprising:

initiating, by a usage metering and billing (UMB) management module executing on a server via a network, discovery agents executing on one or more on demand platforms for interrogating one or more server resources each executing on one of the one or more on demand platforms;

interrogating by the discovery agents the one or more server resources to discover a plurality of discrete server processes and associated discovery data for each process, the discovery data comprising a name and hierarchy information associated with each discrete server process;

collecting the discovery data for the discovered discrete server processes in a centralized repository;

accessing an application map associated with a particular customer, wherein the application map defines both services and processes associated with the particular customer;

mapping one or more of the discovered discrete server processes to an application and the particular customer based on the collected discovery data by comparing a discovered path to the application map for the particular customer;

in the event of a match between the discovered path and the application map, associating the discovered path and its discovery data with the particular customer and storing an indication of the association; and generating a customer bill based on discrete server processes mapped to the particular customer.

8. The computer-readable medium of claim 7, further comprising discovering one or more server resources during a scan of a network.

9. The computer-readable medium of claim 8, further comprising scanning the network for server resources based on defined conditions.

10. The computer-readable medium of claim 7, further comprising performing an administrative function based on the mapped discrete server processes.

11. The computer-readable medium of claim 10, wherein performing an administrative function comprises generating a report based on the mapped discrete server processes, assigning a customer to a discovered discrete server process, or changing a status of a discrete server process.

12. The computer-readable medium of claim 7, wherein collecting discovery data for the discovered discrete server processes in the centralized repository comprises receiving notification of a found server and associated discovery data.

13. An on demand application system, the system comprising:

one or more on demand platforms to execute discrete server processes of an on demand application, each on demand platform comprising a discovery agent to interrogate an on demand platform to discover the discrete server processes and associated discovery data for each process, the discovery data comprising a name and hierarchy information associated with each discrete server process; and a usage metering and billing (UMB) server having one or more processors in communication with the one or more on demand platforms via a network, the UMB server comprising:

a UMB management module to receive discovery data relating to discovered discrete server processes from the discovery agents and to initiate discovery agents executing on the one or more on demand platforms;

a centralized repository to store discovery data relating to discovered discrete server processes and to store application maps associated with particular customers, each application map defining both services and processes associated with a customer;

an assignment processor of the UMB management module to map the stored discrete server processes to an application and a customer based on the collected discovery data by accessing an application map associated with a particular customer from the centralized repository, comparing a discovered path to the application map for the particular customer, and, in the event of a match between the discovered path and the application map, associating the discovered path and its discovery data with the particular customer; and wherein the assignment processor generates customer bills based on which discrete server processes are mapped to a particular customer.

14. The system of claim 13, wherein the UMB management module further comprises an interface console to receive input from a user and to provide output to a user.

15. The system of claim 13, wherein the UMB management module further comprises a discovery processor to collect received discovery data and to store the collected discovery data in the centralized repository.

16. The system of claim 13, wherein the centralized repository is located within the UMB management module.

17. The system of claim 13, wherein the centralized repository is adapted to store aggregated discovery data, discovered application maps, configuration associations, and administration information.

* * * * *